United States Patent
Laxton et al.

(10) Patent No.: US 8,353,197 B2
(45) Date of Patent: Jan. 15, 2013

(54) DIFFERENTIAL COMPARATIVE PRESSURE MONITORING SYSTEM

(75) Inventors: Nigel Laxton, Mt. Hawthorn (AU); Henry Kroker, Osborne Park (AU)

(73) Assignee: Structural Monitoring Systems Ltd., Osborne Park (AU)

( * ) Notice: Subject to any disclaimer, the term of this patent is extended or adjusted under 35 U.S.C. 154(b) by 285 days.

(21) Appl. No.: 12/744,132

(22) PCT Filed: Nov. 21, 2008

(86) PCT No.: PCT/AU2008/001723
§ 371 (c)(1), (2), (4) Date: Jul. 20, 2010

(87) PCT Pub. No.: WO2009/065175
PCT Pub. Date: May 28, 2009

(65) Prior Publication Data
US 2010/0281952 A1    Nov. 11, 2010

(30) Foreign Application Priority Data
Nov. 21, 2007 (AU) ................................ 2007906374

(51) Int. Cl.
G01M 3/02 (2006.01)
G01M 3/04 (2006.01)

(52) U.S. Cl. .............................................. 73/37; 73/40

(58) Field of Classification Search ............... 73/37, 40, 73/49.1, 49.2, 49.5
See application file for complete search history.

(56) References Cited

U.S. PATENT DOCUMENTS

| 5,770,794 | A | 6/1998 | Davey |
| 5,996,402 | A * | 12/1999 | Harris ............................ 73/49.7 |
| 6,539,776 | B2 | 4/2003 | Davey |
| 6,591,661 | B2 | 7/2003 | Davey |
| 6,715,365 | B2 | 4/2004 | Davey |
| 6,720,882 | B2 | 4/2004 | Davey |
| 2002/0029614 | A1 | 3/2002 | Davey |
| 2002/0092355 | A1 | 7/2002 | Davey |
| 2002/0140181 | A1 * | 10/2002 | Werner ......................... 277/628 |

FOREIGN PATENT DOCUMENTS

| WO | WO 94/27130 A | 11/1994 |
| WO | WO 01/98746 A | 12/2001 |
| WO | WO 02/086437 A | 10/2002 |
| WO | WO 2007/112511 A | 10/2007 |
| WO | WO 2007/115363 A | 10/2007 |
| WO | WO 2007/128053 A | 11/2007 |
| WO | WO 2008/067586 A | 6/2008 |

* cited by examiner

*Primary Examiner* — Hezron E Williams
*Assistant Examiner* — David Z Huang
(74) *Attorney, Agent, or Firm* — Frommer Lawrence & Haug LLP; Ronald R. Santucci (57) ABSTRACT

A differential comparative pressure monitoring system (10) for monitoring the structural integrity of a structure (30) has a pressure source (12); a first fluidic circuit (14), and a reference fluidic circuit (16) which are connected in parallel to the pressure source (12); and a monitoring device (18). The first and reference fluidic circuits (14) and (16) have substantially matched characteristics. The first circuit (14) has a sensor element (20) which is sealed to a surface (28) on the structure (30). The reference circuit (16) is in fluidic isolation from the surface (28) of the structure (30). The monitoring device (18) takes simultaneous measurements of a common fluidic characteristic of the circuits (14) and (16), and produces a signal indicative the integrity of the structure based on a difference between the simultaneously measured common characteristic.

36 Claims, 4 Drawing Sheets

DIFFERENTIAL COMPARATIVE PRESSURE MONITORING SYSTEM

This application is a 371 of PCT/AU2008/001723 filed on Nov. 21, 2008, published on May 28, 2009 under publication number WO 2009/065175 A and claims priority benefits of Australian Patent Application Number 2007906374 filed Nov. 21, 2007, the disclosure of which is hereby incorporated by reference.

FIELD OF THE INVENTION

The present invention relates to a differential comparative pressure monitoring system for monitoring the integrity of a component or structure.

BACKGROUND OF THE INVENTION

Applicant has developed numerous systems, devices and methods for structural integrity monitoring and structural health monitoring which may be used for example to detect and/or monitor the propagation of, cracks or other faults on or in a component or structure. Examples of such systems, devices and methods are the subject of various patents including U.S. Pat. No. 5,770,794; U.S. Pat. No. 6,539,776; U.S. Pat. No. 6,591,661; U.S. Pat. No. 6,715,365; and U.S. Pat. No. 6,720,882.

By and large, the inventions described in the above referenced patents utilise changes in pressure, vacuum level, or fluid flow into or out of a cavity arising from a crack propagating to an extent that it creates a fluid flow path between the cavity and an otherwise isolated environment.

The present invention arises from further development by Applicant in the above field of technology.

It is to be understood that, if any prior art publication is referred to herein, such reference does not constitute an admission that the publication forms a part of the common general knowledge in the art, in Australia or any other country.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

SUMMARY OF THE INVENTION

One aspect of the present invention provides a differential comparative pressure monitoring system for monitoring of structural integrity of a component or structure, the system comprising,
  a pressure source;
  a first fluidic circuit and a reference fluidic circuit, the fluidic circuits having substantially matched characteristics, the first and reference circuits connected in parallel to the pressure source, wherein the first circuit comprises a sensor element sealed to a surface on or in the structure or component, the sensor element together with the surface of the structure or component defining a first cavity, and wherein the reference circuit is isolated from the surface of the structure or component; and,
  a monitoring device coupled to the first and reference circuits, the monitoring device taking simultaneous measurements of a common fluidic characteristic of the first and reference circuits and producing a signal indicative of the integrity of the structure or component based on a difference between the simultaneously measured common fluidic characteristic of the first and reference circuits.

The reference circuit may comprise a reference cavity having characteristics substantially matched to the first cavity.

The first cavity and the reference cavity may be substantially co-located.

In one embodiment the first cavity and the reference cavity are formed in the sensor element. In this embodiment the sensor element is provided with a first surface that is sealed to the surface of the structure or component and a second opposite surface, wherein a first groove or channel is formed in the first surface, the first groove or channel forming the first cavity when the first surface is sealed to the structure or component; and, wherein the reference cavity is provided internal of the first and second surfaces of the sensor element.

The sensor element may be formed as a laminate structure having a first layer which comprises the first surface and in which the first groove or channel is formed and a second layer seal onto the first layer on a surface opposite the first surface, wherein second layer comprises the second opposite surface and the reference cavity is formed between the first and second layers.

In another embodiment the reference cavity is formed in a reference sensor element separate to the sensor element.

The first fluidic circuit may comprise a first high fluid flow impedance connected in series between the pressure source and the first cavity. The reference circuit comprises a reference high fluid flow impedance connected in series between the pressure source and the reference cavity. The first and reference high fluid flow impedances may be formed to have substantially identical impedance to fluid flow.

The first and reference fluidic circuits may be configured to extend substantially adjacent to each other.

The system may further comprise a second fluidic circuit, the second fluidic circuit in fluidic communication with a second pressure source having a second pressure that is different to a first pressure of the first pressure source. In one embodiment, the first pressure is negative relative to the second pressure.

The second circuit may comprise a second groove or channel formed in the sensor element which, when the sensor element is sealed to the surface of the structure or component forms a second cavity adjacent to but sealed from the first cavity.

The first and second cavities may be arranged to have matched fluidic characteristics. Furthermore the first and second fluidic circuits may have matched fluidic characteristics. Accordingly the second fluidic circuit has fluidic characteristics substantially matched with those of the reference circuit.

The system may further comprise a first by-pass valve shunted across the first fluid flow impedance and having closed state forming a fluidic short circuit across the first high fluid flow impedance.

The system further comprises a reference by-pass valve shunted across the reference high fluid flow impedance, the reference by-pass valve having a closed state forming a fluidic short circuit across the reference high fluid flow impedance.

The system may comprise a first continuity valve for selectively opening and sealing a end of the first fluidic circuit distant the pressure source.

The system may comprise a reference continuity valve for selectively opening and sealing a end of the reference fluidic circuit distant the pressure source.

The system may further comprise a switch over valve in fluid communication at one end to the pressure source and selectively connectable at an opposite end to the first fluidic circuit or the second fluidic circuit.

The system may comprise a measurement instrument which comprises the pressure source and a first portion of the first and reference fluidic circuits; and a sensor unit which comprises the sensor element and a second portion of the first and reference fluidic circuits, and wherein the instrument and the sensor unit can be selectively coupled and decoupled from each other.

The system may comprise a multi-strand pneumatic cable, the cable comprising a third portion of the first and reference fluidic circuits, and wherein the cable is connectable at opposite ends to the instrument and the sensor unit.

BRIEF DESCRIPTION OF THE DRAWINGS

Embodiment of the present invention will now be described by way of example only with reference to the accompanying drawings:

FIG. 3 is a schematic representation of an integral sensor incorporated in an embodiment of the system, FIG. 3 is a bottom view of a sensor element incorporated in one embodiment of the system;

FIG. 6b is a cross section view of the second element shown in FIG. 6a;

FIG. 6c is a longitudinal section view of the second element shown in FIG. 6a;

DETAILED DESCRIPTION OF PREFERRED EMBODIMENTS

Referring to the accompanying drawings and in particular FIGS. 1-5, an embodiment of a differential comparative pressure monitoring system 10 for monitoring the structural integrity of a structure or component 30 comprises a pressure source 12, a first fluidic circuit 14, a reference fluidic circuit 16, and a monitoring device 18. The first and reference fluidic circuits 14 and 16 are formed to have substantially matched characteristics. These characteristics include volumetric capacity of each of the circuits, fluid flow rates through the circuits, their temperature characteristics, and diffusion characteristics. The circuits 14 and 16 are connected in parallel to the pressure source 12 so that when each of the circuits 14 and 16 is complete, and assuming no breach in either circuit, the fluid within the circuits is at substantially the same pressure.

The pressure source may be either positive or negative pressure source relative to ambient pressure.

Figure 3:
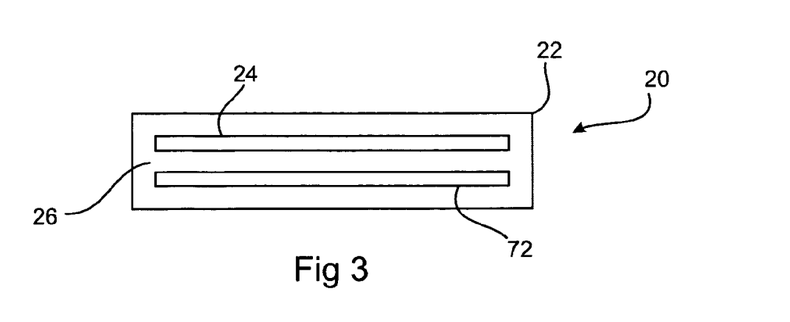
Figure 4A:
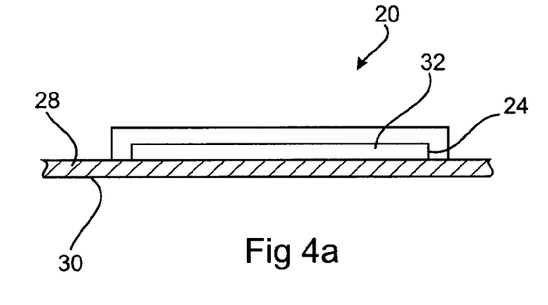
FIG. 4a is a longitudinal section view of the sensor element shown in FIG. 3.
Figure 4B:
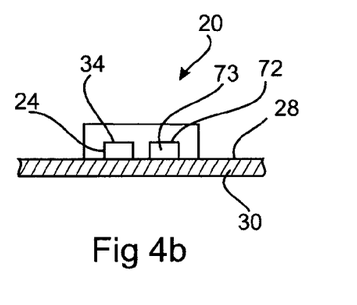
FIG. 4b is a cross section view of the sensor element shown in FIG. 3.
Figure 5:
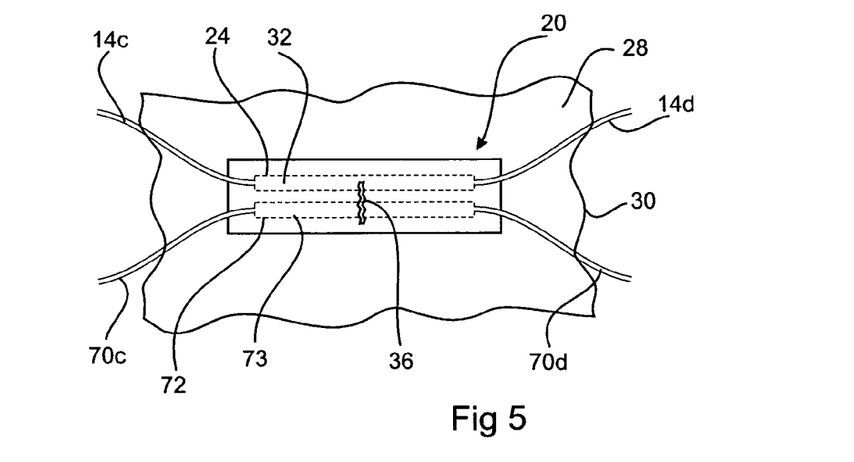
FIG. 5 is a top view of the sensor shown in FIG. 3-4b applied to the surface of a structure.

The first circuit 14 comprises a sensor element 20 (also shown in detail in FIG. 3). The sensor element 20 is sealed to a surface 28 on the structure or component 30 being monitored by the system 10. As explained in greater detail below, the sensor element 20 when sealed to the surface to the structure or component defines a first cavity 32. However the reference circuit 16 is in fluidic isolation from the surface 28 of the structure or component 30. The monitoring device 18 is coupled to the first and reference circuits 14 and 16 and takes simultaneous measurements of a common fluidic characteristic of the circuits 14 and 16, and produces a signal indicative the integrity of the structure or component based on a difference between the simultaneously measured common characteristic of the circuits 14 and 16. Examples of the common fluidic characteristic may be fluid flow rate through, or fluid pressure within: the circuits 14 and 16; or, matched components of the circuits 14 and 16.

A very simple form of sensor 20 is depicted in FIGS. 3, 4a, 4b and 5. In this embodiment the sensor 20 comprises a thin strip 22 of substantially impervious material provided with a longitudinal first groove or channel 24 formed in a bottom surface 26 of the strip 22. The groove 24 terminates inboard of the peripheral edge of the strip 22 and does not extend through the thickness of the strip 22. When the strip 22 is sealed onto the surface 28 of structure 30, a first cavity 32 is created by the groove 24 and the underlying portion of the surface 28.

The first circuit 14 comprises conduits 14c and 14d that connect with the sensor 20 and are in fluid communication with opposite ends of the channel 24 and thus the first cavity 32 when the sensor 28 is adhered to the surface 28 of the structure 30. Assuming that the first cavity 32 is at a different pressure to ambient pressure by virtue of the fluidic connection of the circuit 14 to the pressure source 12, if a crack 36 were to develop in the surface 28 of a length that extended between the first cavity 32 and the surrounding atmosphere, there would be a change in the pressure condition in the first cavity, 32 and a flow of air through (i.e. into or out of) the circuit 14. The monitoring system 18 is configured to detect such a change in pressure or fluid flow. More specific details of the monitoring system 18 will be described later in the specification. Whether air flows into or out of the circuit 14 simply depends on whether the pressure source 12 is a positive pressure or a negative pressure relative to ambient pressure.

The reference circuit 16 is formed to have substantially matched fluidic characteristics (e.g. volume and fluid flow rate) to the first circuit 14. However the reference circuit 16 is isolated from the surface 28 of the structure 30. Here, the expression "isolated" means a pressure condition of the circuit 16 is not affected by the formation or propagation of a crack 36 in the structure 30 that may breach the first cavity 32. Thus, assuming matched characteristics of the circuits 14 and 16, given that they are connected in parallel to the pressure source 12 and thus are subjected to the same pressure conditions, in the absence of a crack 36 breaching the first cavity 32, both circuits 14 and 16 should have substantially identical time-phased pressure response. Thus, a graph or curve showing the relationship of pressure with time in the circuit 14 will be substantially identical to that for circuit 16. Accordingly by the monitoring device 18 subtracting the time-phased pressure response of circuit 16 from the time-phased pressure response of circuit 14 the influence of noise such as pressure transients can be markedly reduced.

Pressure transients that often arise due to influences of the atmosphere and environment (e.g. heating of a portion of a conduit in direct sunlight, or cooling of a portion of a circuit extending through an air-conditioned room) are observed as noise requiring a relatively large flow of fluid through a crack 36 in order for the crack 36 to be reliably discriminated above the noise. However with the embodiment of the systems shown in FIGS. 1 and 2, noise transients in each circuit 16 and 14 will be substantially the same and therefore by subtracting the time-phase pressure response of circuit 16 from circuit 14, there is in effect common mode rejection of the noise allowing a substantially lower detection threshold for a crack 36.

Further, as will be appreciated by those skilled in the art, measurement time is substantially reduced as degassing transients in the circuits 14 and 16 will be substantially identical and therefore again subject to a common mode rejection. Therefore embodiment of the system 10 may take reliable readings well before a steady state pressure has been achieved in the circuits 14 and 16

The characteristics of the circuit 16 are matched as closely as possible to those of circuit 14. As the circuit 14 includes a sensor 20 for creating the first cavity 32, a reference sensor element 38 may be provided in the circuit 16 to form the reference cavity 42. In the embodiment depicted in FIGS. 1, 5 and 6 the reference cavity 42 is shown as being formed in the reference element 38 which is a separate element to the sensor element 20, however as explained below, in an alternate embodiment both the first cavity 32 and the reference cavity 42 may be formed in the same sensor element.

Figure 6A:
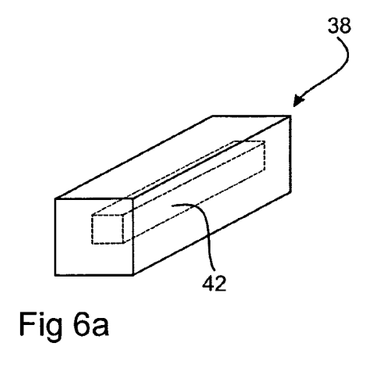
FIG. 6a is an isometric view of a second element incorporated in an embodiment of the system.
Figure 6B:
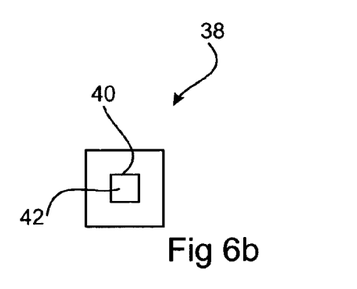
Figure 6C:
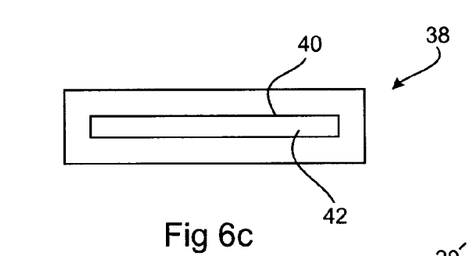

The reference element 38 shown in FIGS. 6a, 6b and 6c is formed to have a channel 40 of the same volume as the channel 24 except the channel 40 is wholly contained within the material of the element 38. This wholly contained channel 40 forms the reference cavity 42. Accordingly the element 38 and more particularly the reference cavity 42 while being located adjacent to, or say on top of the sensor 20, is un-influenced by the formation and propagation of crack 36. The reference circuit 16 also comprises conduits 16c and 16d that are plumbed to opposite ends of the channel 40.

The first circuit 14 comprises a first high fluid flow impedance 46 connected in series between the pressure source 12 and the first cavity 32. Similarly, the circuit 16 comprises a reference high fluid flow impedance 48 connected in series between the pressure source 12 and the reference cavity 42. Commensurate with the matching of the circuits 14 and 16, the characteristics of the impedances 46 and 48 are also matched.

A by-pass valve 50 is shunted across the high impedance 46 with a similar by-pass valve 52 shunted across the high impedance 48. When the by-pass valves 50 and 52 are closed they form a fluidic short-circuit across their respective impedances 46 and 48.

The pressure source comprises a pump 54 connected via a valve 56 to a tank or accumulator 58. In one embodiment, the pump 54 is a vacuum pump which operates to evacuate the tank 58 to a pressure level below ambient pressure. The tank 58 typically has volume or capacity substantially greater than the volume of circuits 14 and 16. The tank 58 is in turn coupled to the circuits 14 and 16 via a valve 60. The pressure source may be un-regulated, i.e. does not need to be maintained at a constant level but rather can vary with time.

The monitoring system 18 comprises a pressure gauge 62 that provides a measure of the pressure of the pressure source 12 and in particular the tank 58. This pressure will be the same as the pressure on the adjacent sides of the impedances 46 and 48. Monitoring system 18 further comprises a pressure gauge 64 providing a measure of pressure at an end of the impedance 46 opposite the gauge 62, and a pressure gauge 66 providing a measure of pressure at an end of the impedance 48 opposite the pressure gauge 62.

In simple terms, variation between the pressure readings on gauges 62 and 64 provide a measure of fluid flow through the impedance 46 while a difference between the readings 62 and 66 provide a measure of fluid flow through the impedance 48. A measurement device 68 which receives inputs from each of the gauges 62, 64 and 66 operates to compare or subtract the fluid flow through the impedance 48 from that from the impedance 46 thereby providing a signal indicative of the integrity of the structure 38. In this regard, due to the matched nature of the circuits 14 and 16, the difference in flow through the impedances 46 and 48 will be most likely a result of a breach in the first cavity 32 arising from the formation or propagation of crack 36 providing fluid communication between the first cavity 32 and ambient pressure, rather than due to noise which is subject to common-mode rejection.

The system 10 further comprises a second fluidic circuit 70 that is in fluid communication with a second pressure source which typically is the ambient atmosphere. Thus in its simplest form, the circuit 70 is simply vented to the atmosphere although it may alternately be coupled to a dedicated second pressure source that has a pressure different to the pressure of the first pressure source 12. The circuit 70 comprises a second groove or channel 72 that runs adjacent to, but is sealed from, the first channel 24 (see for example FIG. 3). The channel 72 forms a second cavity 73 when the sensor element 20 is sealed to the surface 28. The second channel 72 is formed in the sensor element 20 and provides a leakage path to the atmosphere through a crack that traverses the channel 24 (i.e. the first cavity 32). The formation of sensor elements and pads with both first channels or cavities 24/32 and second atmospheric channels 72 is described in numerous patents owned or controlled by the present applicant including U.S. Pat. No. 6,715,365 and International Application number PCT/AU2007/000584.

Figure 7:
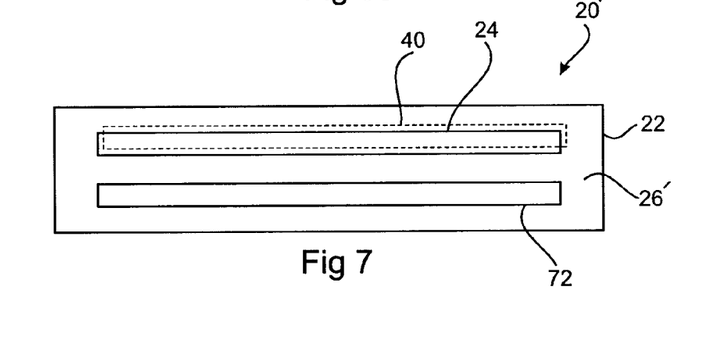
FIG. 7 is a bottom view of an integrated element incorporated in a second embodiment of the system.
Figure 8:
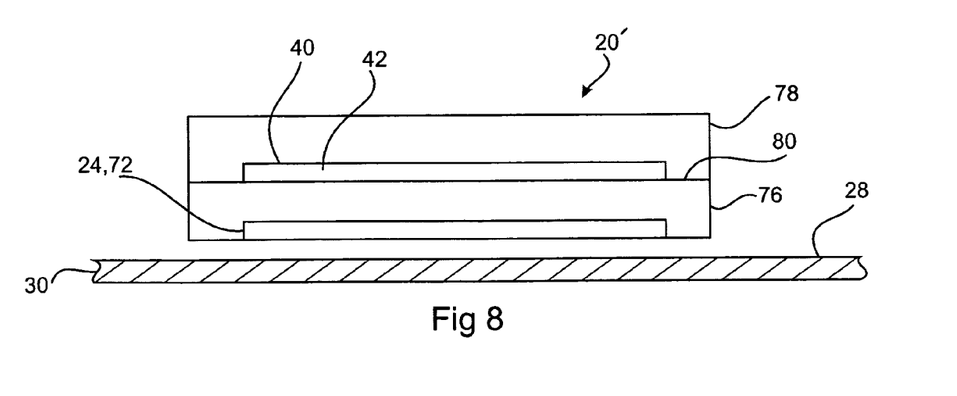
FIG. 8 is a longitudinal section view of the integrated element shown in FIG. 7.

Most conveniently however the first channel 24, the reference cavity 42, and the second channel 72 may all be formed in a single common sensor element 20' an example of which is depicted in FIGS. 7 and 8. The sensor 20' has a bottom surface 26' in which the first channel 24 and the second channel 72 are formed. When the bottom surface 26' is sealed onto the surface 28 of the structure 30, the respective channels 24 and 72 form the first cavity 32 and the second cavity 73 respectively. The reference cavity 42 is formed internally of the sensor 20'. Thus, the reference cavity 42 lies wholly between the bottom surface 26' and upper surface 74 of the sensor 20'. The requirement of the reference cavity 42 is that it has substantially the same fluidic characteristics as the first cavity 32 (when the cavity 32 is not breached).

As depicted in FIG. 8, the sensor 20' is formed as a laminate structure comprising a lower layer 76 and an upper layer 78. The lower layer 76 contains the bottom surface 26' of the sensor 20' and is formed with both the first channel 24 and the second channel 72. The second layer 78 contains the upper surface 74 of the sensor 20' and is formed with an opposite surface 80. The reference channel 40 is formed in the surface 80 and the surface 80 is adhered on to the top of the surface of the lower layer 76 thereby forming the reference cavity 42 between the layers 76 and 78. When the sensor 20' is adhered on to the surface 28 the channels 24 and 72 together with the surface 28 will form the first cavity 32 and second cavity 73. These cavities can be breached by the formation of a crack in the surface 28. However the reference cavity 42 is in fluidic isolation from the surface 28. Additionally the reference cavity 42 is made to have fluidic characteristics substantially identical to the first cavity 32. This may be achieved by forming the corresponding channels 40 and 24 to have substantially the same shape, volume, and permeability as well as being as physically close to each other as possible.

Methods of construction and formation of laminated sensors exemplified by sensor 20' are described in detail in applicants International Application Number PCT/AU2007/000458 the contents of which is incorporated herein by way of reference.

Various types of connectors can be used to provide fluid coupling between the various channels and cavities and the remainder of their respective circuits 14, 16 and 70 as described in applicants International Application Number PCT/AU2007/000584, the contents of which are incorporated herein by way of reference.

Figure 1:
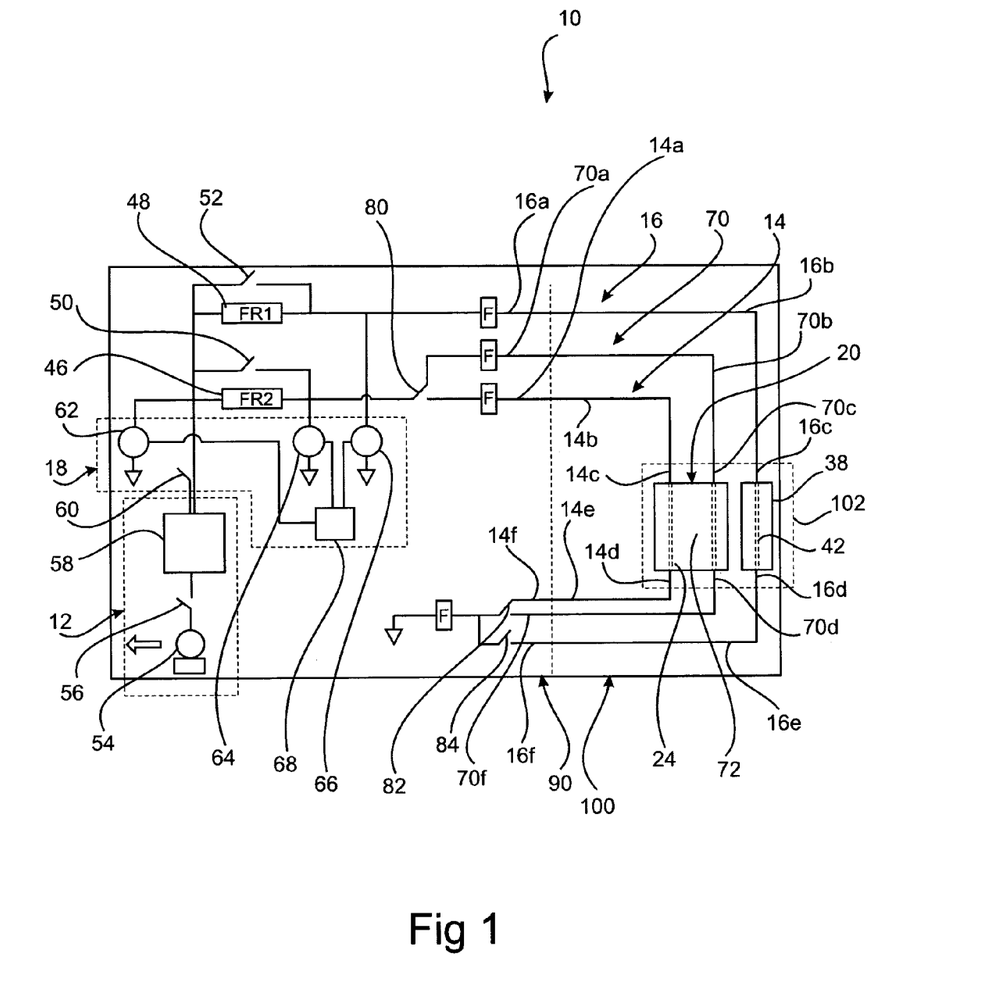
FIG. 1 is a circuit diagram of an embodiment of the differential comparative pressure monitoring system in accordance with the present inventions.
Figure 2:
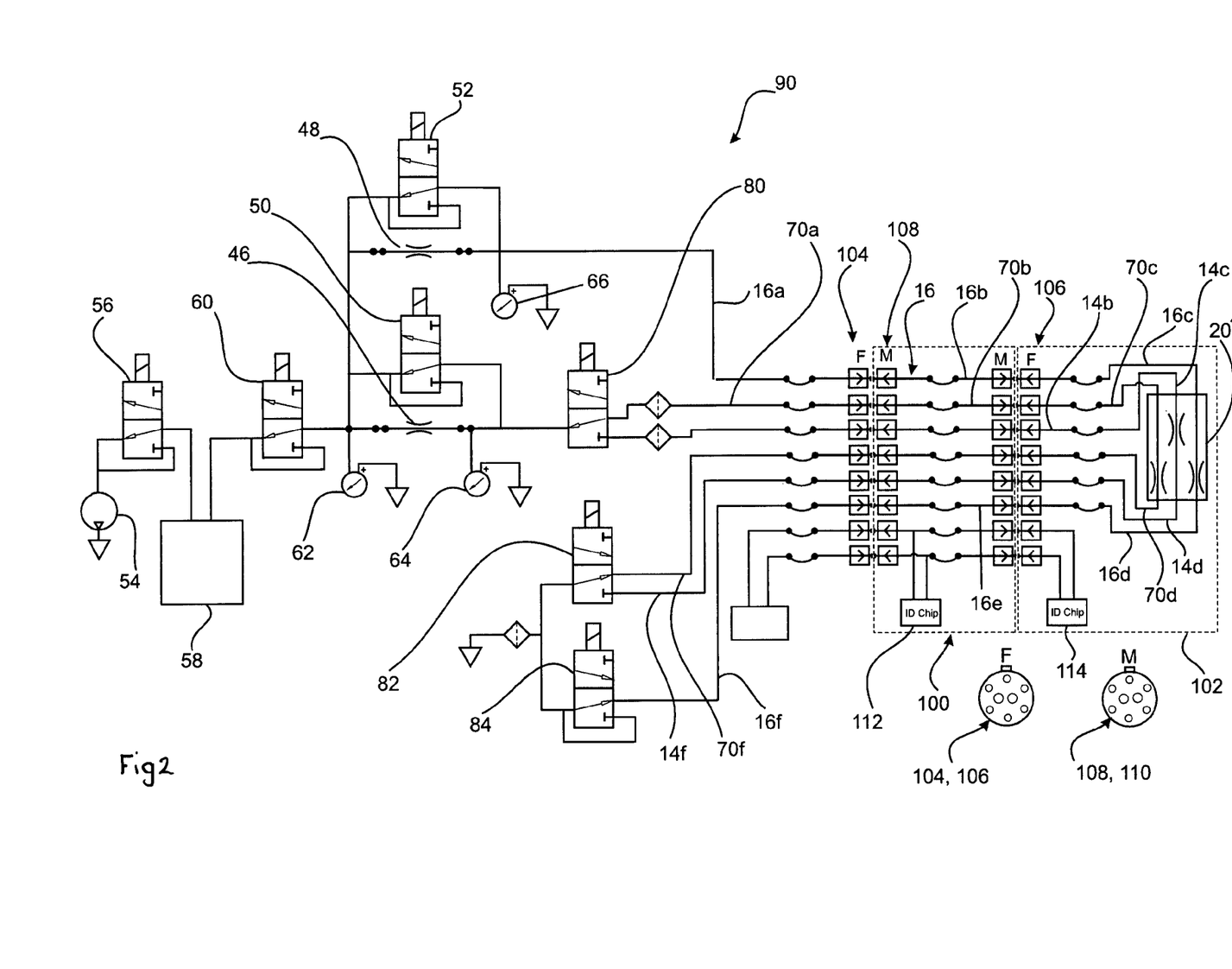
FIG. 2 is a schematic representation of the system shown in FIG. 1.

Referring to FIGS. 1 and 2, the system 10 further comprises a switch over valve 80 and first and reference continuity valves 82 and 84. The valve 80 can be switched between two positions which alternatively connect one of the fluidic circuits 14 and 70 to the source 12 while venting the other of the circuits to atmosphere. In the illustrated embodiment, the valve 80 is shown connecting the circuit 70 to the source 12 while venting the circuit 14 to atmosphere. However switching the valve 80 to its second position reverses this configuration so that the circuit 14 is coupled to the source 12 and the circuit 70 is vented to atmosphere.

The valve 82 can be switched between one position in which it closes (i.e. seals) a distal end of the circuit 14 while opening (i.e. venting to the atmosphere) the distal end of the circuit 70. In a second position of the valve 82, this configuration is reversed so the distal end of circuit 14 is vented to atmosphere and the distal end of circuit 70 is closed.

The valve 84 is movable between one position in which it vents the distal end of the circuit 16 to atmosphere (as shown currently in FIG. 1) and a second position in which it closes the distal end of circuit 16.

Continuity testing of the system 10 may be performed for each of the circuits 14, 16 and 70. To conduct a continuity test of circuit 14, the valve 80 is switched to a position where the circuit 14 is in fluidic communication with the source 12, the valve 50 is left open, and the valve 82 is moved to a position where the distal end of the circuit 14 is left open to atmosphere. Provided there is no blockage in the circuit 14, in such a configuration one would expect to detect a relatively high flow of fluid through the impedance 46. However in the event that the circuit 14 and in particular the sensor 20 is blocked, one would expect a minimal or zero flow through the impedance 46. Similar continuity tests can be conducted on the circuit 70 by switching the valve 80 to connect the circuit 70 to the source 12 while switching the valve 82 to a position where the distal end of circuit 70 is vented to atmosphere. The continuity test of the circuit 16 is conducted by moving the valve 84 to a position where a distal end of the circuit 16 is left open (as indeed shown in FIG. 1).

The valves 50 and 52 maybe closed when initially operating the system 10 for the purposes of the degassing the circuits 14 and 16 in the shortest possible time.

The system 10 comprises the combination of a measurement instrument 90, a multi-strand pneumatic cable 100 and a sensor unit 102. The instrument 90 operates in a manner substantially identical to that described in Applicants Australian Application Number 2006906797 the contents of which are incorporated herein by way of reference. The substantive difference between the invention described in the aforementioned Australian Patent Application and the current instrument 10 is the provision of a second impedance 48 and by-pass valve 52 that may be considered as forming part of the circuit 16; and the addition of a pressure gauge 66.

Referring to FIG. 2 a part of each of the circuits 14, 16 and 70 is contained within the instrument 90; a part contained within lead or cable 100 and a part contained within the sensor unit 102 which comprises the sensor 20' together with a short length of conduit extending to the either side of each of the first, reference and second channels within the lead 20'. The circuit 16 comprises conduits 16a, 16b, 16c, 16d, 16e and 16f. Conduits 16a and 16f are internal to the instrument 10. Conduits 16c and 16d form part of the sensor unit 102, and conduits 16b and 16e are contained within the lead 100. Likewise, circuit 14 comprises conduits 14a and 14f with in the instrument 90; conduits 14c and 14d within the sensor unit 20', conduits 14b and 14e within the cable 100; and circuit 70 comprises conduits 70a and 70f within the instrument 90; conduits 70c and 70d within the sensor unit 102; and conduits 70b and 70e within the lead 100. The conduits within the instrument 90 terminate in a female bulkhead connector 104.

The conduits in the sensor unit 102 terminate in a female bulkhead connector 106. Opposite ends of the conduits contained within the lead 100 terminate in respective male bulkhead connectors 108 and 110. Male bulkhead connectors 108 and 110 can be connected to the female bulkhead connectors 104 and 106 to thereby form the respective fluidic circuits 14, 16 and 70. Identification chips 112 and 114 are contained within the table 100 and the sensor unit 102 respectively to enable identification of these components.

Now that an embodiment of the present invention had been described in detail it will be apparent to those skilled in the relevant arts that numerous modifications and variations may be made without departing from the basic inventive concepts. For example, while the embodiment illustrated in FIGS. 1 and 2 show the provision of the second circuit 70, such a circuit is not required in the broadest form of the invention. In such an example the sensor 20' may be modified from that shown in FIGS. 7 and 8 by the omission of the channel 72. In a further variation, the sensor 20' can be formed with second channel 72 which is simply vented at opposite ends to atmosphere and not connected to any conduits. Also by forming the first and second circuits 14 and 70 to have matched fluidic characteristics, and in particular conduits 14a-14f and channel 24 to have matched fluidic characteristics to conduits 70a-70f and channel 72 respectively either of the circuits 14 and 70 can be switched (i.e. coupled to) the source 12 with the other vented to atmosphere. Naturally if the circuits 14 and 70 have matched fluidic characteristics then so do circuits 16 and 70. All such modifications and variations together with others that would be obvious to a person of ordinary skill in the art are deemed to be within the scope of the present invention the nature of which is to be determined from the above description.

The invention claimed is:

1. A differential comparative pressure monitoring system for monitoring of structural integrity of a component or structure, the system comprising,
   a pressure source;
   a first fluidic circuit and a reference fluidic circuit, the fluidic circuits having substantially matched characteristics, the first and reference circuits connected in parallel to the pressure source, the first circuit comprising a sensor element sealed to a surface on or in the structure or component, the sensor element together with the surface of the structure or component defining a first cavity, the reference circuit being isolated from the surface of the structure or component; and,
   a monitoring device coupled to the first and reference circuits, the monitoring device taking simultaneous measurements of a common fluidic characteristic of the first and reference circuits and producing a signal indicative of the integrity of the structure or component based on a difference between the simultaneously measured common fluidic characteristic of the first and reference circuits.

2. The system according to claim 1 wherein the reference circuit comprises a reference cavity having characteristics substantially matched to the first cavity.

3. The system according to claim 2 wherein the first cavity and reference cavity are substantially co-located.

4. The system according to claim 2 wherein the first cavity and the reference cavity are formed in the sensor element.

5. The system according to claim 4 wherein the sensor element is provided with a first surface that is sealed to the surface of the structure or component and a second opposite surface, wherein a first groove or channel is formed in the first surface, the first groove or channel forming the first cavity when the first surface is sealed to the structure or component; and, wherein the reference cavity is provided internal of the first and second surfaces of the sensor element.

6. The system according to claim 5 wherein the sensor element is formed as a laminate structure having a first layer which comprises the first surface and in which the first groove or channel is formed and a second layer seal onto the first layer on a surface opposite the first surface, wherein second layer comprises the second opposite surface and the reference cavity is formed between the first and second layers.

7. The system according to claim 2 wherein the reference cavity is formed in a reference sensor element.

8. The system according to claim 1 wherein the first fluidic circuit comprises a high fluid flow impedance connected in series between the pressure source and the sensor element.

9. The system according to claim 8 wherein the reference circuit comprises a reference high fluid flow impedance connected in series between the pressure source and the reference cavity.

10. The system according to claim 9 wherein the first and reference high fluid flow impedances are formed to have substantially identical impedance to fluid flow.

11. The system according to claim 9 comprising a reference by-pass valve shunted across the reference high fluid flow impedance, the reference by-pass valve having a closed state forming a fluidic short circuit across the reference high fluid flow impedance.

12. The system according to claim 8 comprising a first by-pass valve shunted across the first fluid flow impedance and having closed state forming a fluidic short circuit across the first high fluid flow impedance.

13. The system according to claim 1 further comprising a second fluidic circuit, the second fluidic circuit in fluidic communication with a second pressure source having a second pressure that is different to a first pressure of the first pressure source.

14. The system according to claim 13 wherein the second circuit comprises a second groove or channel formed in the sensor element which, when the sensor element is sealed to the surface of the structure or component forms a second cavity adjacent to but sealed from the first cavity.

15. The system according to claim 14 wherein the first and second cavities have matched fluidic characteristics.

16. The system according to claim 13 wherein the first and second fluidic circuits have matched fluidic characteristics.

17. The system according to claim 13 further comprising a switch over valve in fluid communication at one end to the pressure source and selectively connectable at an opposite end to the first fluidic circuit or the second fluidic circuit.

18. The system according to claim 1 comprising a first continuity valve for selectively opening and sealing an end of the first fluidic circuit distant the pressure source.

19. The system according to claim 1 comprising a reference continuity valve for selectively opening and sealing an end of the second fluidic circuit distant the pressure source.

20. The system according to claim 1 wherein the system comprises a measurement instrument which comprises the pressure source and a first portion of the first and reference fluidic circuits; and a sensor unit which comprises the sensor element and a second portion of the first and reference fluidic circuits, and wherein the instrument and the sensor unit can be selectively coupled and decoupled from each other.

21. The system according claim 20 wherein the system further comprises a multi-strand pneumatic cable, the cable comprising a third portion of the first and reference fluidic circuits, and wherein the cable is connectable at opposite ends to the instrument and the sensor unit.

22. A differential comparative pressure monitoring system for monitoring of structural integrity of a component or structure, the system comprising:
a pressure source;
a first fluidic circuit and a reference fluidic circuit, the fluidic circuits having substantially matched characteristics, the first and reference circuits connected in parallel to the pressure source, the first circuit comprising a sensor element sealed to a surface on or in the structure or component, the sensor element together with the surface of the structure or component defining a first cavity, the reference circuit being isolated from the surface of the structure or component; and wherein the reference circuit comprises a reference cavity having characteristics substantially matched to the first cavity, the first cavity and the reference cavity being substantially co-located; and
a monitoring device coupled to the first and reference circuits, the monitoring device taking simultaneous measurements of a common fluidic characteristic of the first and reference circuits and producing a signal indicative of the integrity of the structure or component based on a difference between the simultaneously measured common fluidic characteristic of the first and reference circuits.

23. The system according to claim 22 wherein the first cavity and the reference cavity are formed in the sensor element.

24. The system according to claim 23 wherein the sensor element is provided with a first surface that is sealed to the surface of the structure or component and a second opposite surface, wherein a first groove or channel is formed in the first surface, the first groove or channel forming the first cavity when the first surface is sealed to the structure or component; and, wherein the reference cavity is provided internal of the first and second surfaces of the sensor element.

25. The system according to claim 22 further comprising a second fluidic circuit, the second fluidic circuit in fluidic communication with a second pressure source having a second pressure that is different to a first pressure of the first pressure source.

26. The system according to claim 25 wherein the second circuit comprises a second groove or channel formed in the sensor element which, when the sensor element is sealed to the surface of the structure or component forms a second cavity adjacent to but sealed from the first cavity.

27. The system according to claim 26 wherein the first and second cavities have matched fluidic characteristics.

28. The system according to claim 25 wherein the first and second fluidic circuits have matched fluidic characteristics.

29. A differential comparative pressure monitoring system for monitoring of structural integrity of a component or structure, the system comprising:
- a pressure source;
- a first fluidic circuit and a reference fluidic circuit, the fluidic circuits having substantially matched characteristics, the first and reference circuits connected in parallel to the pressure source, the first circuit comprising a sensor element sealed to a surface on or in the structure or component, the sensor element together with the surface of the structure or component defining a first cavity, the reference circuit being isolated from the surface of the structure or component; and wherein the reference circuit comprises a reference cavity having characteristics substantially matched to the first cavity, the first cavity and the reference cavity being formed in the sensor element; and,
- a monitoring device coupled to the first and reference circuits, the monitoring device taking simultaneous measurements of a common fluidic characteristic of the first and reference circuits and producing a signal indicative of the integrity of the structure or component based on a difference between the simultaneously measured common fluidic characteristic of the first and reference circuits.

30. The system according to claim 29 wherein the sensor element is provided with a first surface that is sealed to the surface of the structure or component and a second opposite surface, wherein a first groove or channel is formed in the first surface, the first groove or channel forming the first cavity when the first surface is sealed to the structure or component; and, wherein the reference cavity is provided internal of the first and second surfaces of the sensor element.

31. The system according to claim 30 wherein the sensor element is formed as a laminate structure having a first layer which comprises the first surface and in which the first groove or channel is formed and a second layer seal onto the first layer on a surface opposite the first surface, wherein second layer comprises the second opposite surface and the reference cavity is formed between the first and second layers.

32. The system according to claim 29 further comprising a second fluidic circuit, the second fluidic circuit in fluidic communication with a second pressure source having a second pressure that is different to a first pressure of the first pressure source.

33. A differential comparative pressure monitoring system for monitoring of structural integrity of a component or structure, the system comprising,
- a pressure source;
- a first fluidic circuit and a reference fluidic circuit, the fluidic circuits having substantially matched characteristics, the first and reference circuits connected in parallel to the pressure source, the first circuit comprising a sensor element sealed to a surface on or in the structure or component, the sensor element together with the surface of the structure or component defining a first cavity, the reference circuit being isolated from the surface of the structure or component; and,
- a monitoring device coupled to the first and reference circuits, the monitoring device taking simultaneous measurements of a common fluidic characteristic of the first and reference circuits and producing a signal indicative of the integrity of the structure or component based on a difference between the simultaneously measured common fluidic characteristic of the first and reference circuits; and
- a measurement instrument which comprises the pressure source and a first portion of the first and reference fluidic circuits; and a sensor unit which comprises the sensor element and a second portion of the first and reference fluidic circuits, and wherein the instrument and the sensor unit can be selectively coupled and decoupled from each other.

34. The system according to claim 33 wherein the first cavity and the reference cavity are formed in the sensor element.

35. The system according to claim 34 wherein the sensor element is provided with a first surface that is sealed to the surface of the structure or component and a second opposite surface, wherein a first groove or channel is formed in the first surface, the first groove or channel forming the first cavity when the first surface is sealed to the structure or component; and, wherein the reference cavity is provided internal of the first and second surfaces of the sensor element.

36. The system according to claim 33 further comprising a second fluidic circuit, the second fluidic circuit in fluidic communication with a second pressure source having a second pressure that is different to a first pressure of the first pressure source.

* * * * *